United States Patent [19]

Williams

[11] Patent Number: 5,062,872
[45] Date of Patent: Nov. 5, 1991

[54] AIR FILTER WITH HORIZONTAL FILTER ELEMENTS

[75] Inventor: Roger D. Williams, Dallas, N.C.

[73] Assignee: Pneumafil Corporation, Charlotte, N.C.

[21] Appl. No.: 351,095

[22] Filed: May 12, 1989

[51] Int. Cl.$^5$ ............................................. B01D 46/04
[52] U.S. Cl. ........................................ 55/302; 55/379; 55/341.1; 55/481
[58] Field of Search ............. 55/302, 378, 379, 341.1, 55/341.7, 350, 481

[56] References Cited

U.S. PATENT DOCUMENTS

| | | | |
|---|---|---|---|
| 333,020 | 12/1885 | Morgan | 55/300 |
| 582,967 | 5/1897 | Wilson | 55/300 |
| 1,601,148 | 12/1926 | Ruemelin | 55/304 |
| 1,743,934 | 1/1930 | Ruemelin | 55/341.2 |
| 1,816,064 | 7/1931 | von Waldenburg-Straus-Scharina | 55/304 |
| 2,255,519 | 9/1941 | Preston | 55/341.6 |
| 2,732,099 | 1/1956 | Davis | 222/1 |
| 2,867,289 | 1/1959 | Sare | 55/294 |
| 3,385,033 | 5/1968 | Basore et al. | 55/302 |
| 3,421,295 | 1/1969 | Swift et al. | 55/302 |
| 3,973,935 | 8/1976 | Moore Jr. et al. | 55/302 |
| 4,171,963 | 10/1979 | Schuler | 55/302 |
| 4,174,204 | 11/1979 | Chase | 55/302 |
| 4,218,227 | 8/1980 | Frey | 55/302 |
| 4,226,723 | 10/1980 | Purchas | 210/332 |
| 4,277,260 | 7/1981 | Browning | 55/273 |
| 4,292,053 | 9/1981 | Remillieux | 55/96 |
| 4,390,354 | 6/1983 | Witchell | 55/337 |
| 4,395,269 | 7/1983 | Schuler | 55/302 |
| 4,409,009 | 10/1983 | Lissy | 55/302 |
| 4,560,396 | 12/1985 | O'Dell | 55/302 |
| 4,760,968 | 8/1988 | Binzen | 241/101.2 |
| 4,820,320 | 4/1989 | Cox | 55/302 |

FOREIGN PATENT DOCUMENTS

627841 10/1978 U.S.S.R. .
2088744 6/1982 United Kingdom .

*Primary Examiner*—Bernard Nozick
*Attorney, Agent, or Firm*—Shefte, Pinckney & Sawyer

[57] ABSTRACT

Apparatus for filtering dust and the like entrained in a flow of transport air which includes an enclosed housing having an upper filtering portion and a lower hopper for collecting dust. A plurality of filter elements are disposed in the upper housing portion, and a specially formed inlet plenum directs the transport air with entrained foreign particles in a predetermined direction toward the hopper so that heavier particles of dust are carried directly to the hopper by inertia rather than collecting on the filter elements. The filter elements are support solely by a cluster of support rods extending across the housing, and an access opening and closure door are provided for inserting and removing the filter elements. A latch assembly is provided which slidably engages the enclosure door at its closed position, after which it can be tightened, all without requiring any special tools.

14 Claims, 5 Drawing Sheets

AIR FILTER WITH HORIZONTAL FILTER ELEMENTS

BACKGROUND OF THE INVENTION

This invention relates generally to apparatus for filtering large volumes of transport air having dust or other foreign matter entrained therein by passing such transport air through a plurality of self-cleaned filter elements, usually cylindrically shaped pleated paper filter elements.

Historically, industrial filters have been designed to filter and clean large volumes of air by utilizing a plurality of large fabric bags through which the dirty air flows and deposits the entrained foreign matter on the surface of the bags. The effective life of these so-called "baghouse" filters is extended considerably by periodically cleaning the bags, such as by mechanical shaking, by pulses of air or the reverse flow of pressurized air, whereby most of the foreign matter deposited on the bags is removed therefrom and allowed to fall by gravity into a collection hopper or the like.

In Frey U.S. Pat. No. 4,218,227, an improved industrial dust collector is disclosed in which compact pleated paper filter elements are substituted for the conventional bag filters. As explained in greater detail in such patent, the compact size of the pleated paper filter elements, as compared to the much larger cylindrical bags, resulted in a significant reduction in the overall size of the filter apparatus as a whole, assuming the same quantity of transport air is cleaned by both units. In the Frey dust collector and most of its progeny, the pleated paper filters are generally cylindrical in shape and are mounted to a partition plate to hang vertically downwardly therefrom. Since the filter elements depend vertically downwardly, the bottom ends of the filter must be blanked off or capped to prevent the upwardly moving transport air from entering the filter without passing through the filter media, and therefor the vertically disposed filter elements themselves reduce the available space for proper interstitial velocity of the transport air, whereby a larger overall dust collector housing must be provided to assure such proper interstitial velocity. Moreover, this type of dust collector usually suffered the disadvantage of requiring a relatively complex mounting arrangement for mounting the filter elements within the housing at a vertical disposition, and when the filter elements eventually had to be replaced, the usual practice was to shut the dust collector down for a considerable period of time so that a workman could enter the filter apparatus and manually remove and replace each filter element from inside the housing of the filter apparatus.

In an effort to overcome some of the aforesaid disadvantages of the conventional dust collector having pleated paper filter elements, it has been proposed to position such filter elements with a horizontal extent or at least generally horizontal extent, as compared with the vertical extent as disclosed in the Frey patent. Representative disclosures of such horizontal-type dust collectors may be found in Schuler U.S. Pat. No. 4,395,269, Browning U.S. Pat. No. 4,277,260, and Russian Patent 627841. The Schuler patent states that the dust collector disclosed therein, which includes generally horizontal positioning of the filter elements, results in a more compact dust collector that has a cleaning capacity of at least forty to fifty or more c.f.m. per cubic foot of volume, as compared with the typical vertically disposed filter elements. Advantages are also asserted to result from the downwardly slanted positioning of the filter elements, and the utilization of a baffle at the inlet of the dust collector which is struck by the particles of foreign matter entering the dust collector, to thereby prevent direct impingement of such foreign matter upon the uppermost filter elements and reduce wear on such filter elements. However, with this arrangement, a somewhat complicated mounting arrangement is provided for the filter elements, including a specially formed stepped mounting plate, a cantilevered yoke assembly for extending through the interior of each filter element to support it, and an end cap detachably mounted on the yoke by a bolt and handle. Moreover, the presence of the baffle at the inlet of the dust collector inherently interferes with the downward flow of the dust particles impinging thereagainst, whereby the relatively large particles tend to remain entrained in the transport air for cleaning by the filter elements rather than passing directly to the bottom of the dust collector for collection thereat without burdening the filter elements in a manner that can increase the pressure drop thereacross and/or require most frequent cleaning by the pulse jet cleaning apparatus.

In contrast to the devices discussed above, the present invention provides a dust collector or filtering apparatus which obtains all of the space saving advantages obtained from using horizontally disposed filter elements while also alleviating the aforesaid drawbacks associated with known apparatus.

SUMMARY OF THE INVENTION

In accordance with the present invention, apparatus for filtering dust and the like entrained in a flow of transport air or other gas is provided, such apparatus comprising a generally enclosed housing having a side wall, an upper filtering portion, and a lower collection portion. A plurality of conventional filter elements are disposed in the upper portion of the housing, each such filter element being generally hollow and mounted with its central axis extending substantially horizontally away from the side wall of the housing, the filter elements being arranged in at least one, and preferably two, generally vertical columns with a predetermined spacing between each filter element and between the two columns. An inlet arrangement for the dirty air is located at the side wall of the housing, and it is formed to direct the dirty air in a predetermined flow path that is directed downwardly toward the lower collection portion of the housing and alongside the exterior surfaces of the filter elements in the aforesaid vertical column or columns, whereby the heavier particles of foreign matter entrained in the transport air will be carried by inertia and the transport air directly to the lower portion of the housing for collection thereat, and the lighter particles of foreign matter will be separated from the carrier air by passing through the filter elements. An outlet is provided for communicating with the downstream side of the filter elements for permitting removal of the cleaned transport air, and, preferably, a conventional pulse jet cleaning apparatus is provided for periodically transmitting pulses of pressurized air to the interior of the filter elements for cleaning dust particles and the like from the exterior surface of such filter elements.

In the preferred embodiment of the present invention, the filter elements are arranged in two vertical columns having a spacing therebetween, and the inlet for the dirty air includes an opening in the side wall of the housing that is positioned adjacent the spacing between the two columns of filter elements. Additionally, the inlet includes a specially formed plenum that receives transport air adjacent the top of the housing and directs the transport air in a downward direction toward and through the inlet opening, the inlet plenum having a gradually decreasing cross-sectional area along its downward extent.

Additionally, in the preferred embodiment of the present invention, each filter element is individually supported in the upper housing by three support rods extending horizontally across the upper housing, with two of such support rods being spaced apart to permit the exterior surface of the cylindrical filter elements to rest thereon, whereby such support rods constitute the sole support for the filter element, and the third support rod extends above the surface of the filter element to prevent movement of the filter element in any direction. In accordance with a further feature of the present invention, the housing includes an access wall having a plurality of access openings therein, each access opening being aligned with a cluster of three support rods for each filter element, whereby the filter elements can be easily inserted in, or removed from, the upper housing by moving the filter element through the access openings and sliding them along the horizontally extending support rods. Each access opening is preferably provided with a hinged door that includes a resilient sealing material mounted on the inside face of the door so that when the door is at its closed position to cover the access opening, the sealing material will be urged against the end of the filter element for that access opening to thereby seal the end of the filter element and prevent the flow of dirty air around the end of the filter element. Also, each door is provided with a unique latch arrangement that includes cooperating slots located in the door and in the housing, and a carriage bolt member slidable in these slots between an inoperable position releasing the door to permit opening thereof, and an operable position at which the door is maintained at its closed position, the carriage bolt member including a manually turnable element for readily securing the door in its closed position without requiring any tools.

DESCRIPTION OF THE PREFERRED EMBODIMENT

Figure 1:
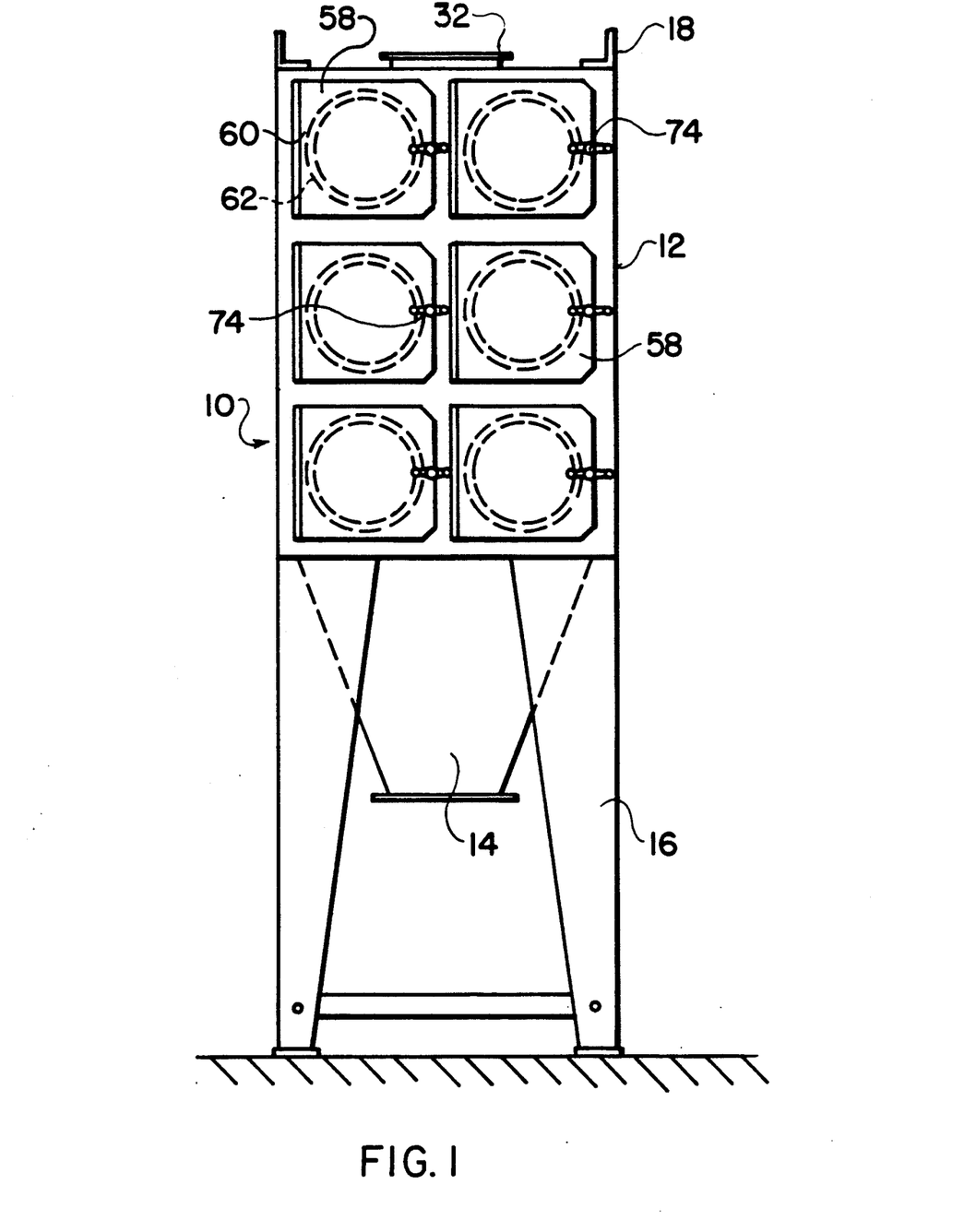
FIG. 1 is a front elevational view of a filter apparatus according to the present invention.
Figure 2:
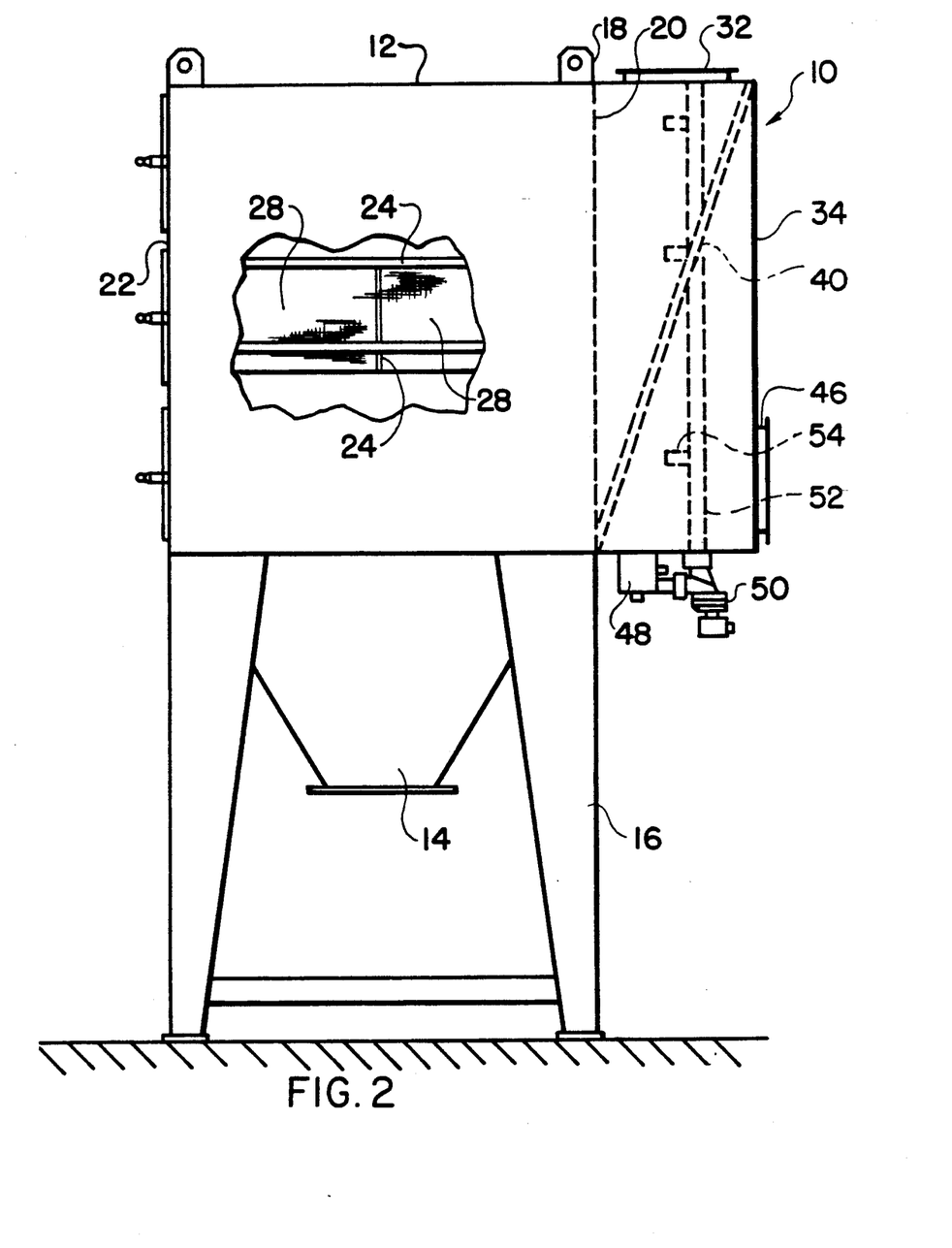
FIG. 2 is a side elevational view of the filter apparatus shown in FIG. 1.

Looking now in greater detail at the accompanying drawings, FIGS. 1 and 2 illustrate a dust collector or filtering apparatus 10 which includes an upper housing portion 12 in which filtering of transport air having entrained foreign particles therein is carried out in a manner to be described presently, and a lower housing portion 14, generally referred to as a hopper, in which the particles separated from the transport air are collected and ultimately removed in any conventional manner through the bottom of the hopper 14. A plurality of legs 16 are provided, and lifting lugs 18 may also be provided for lifting and moving the filter apparatus 10 when desired.

Figure 3:
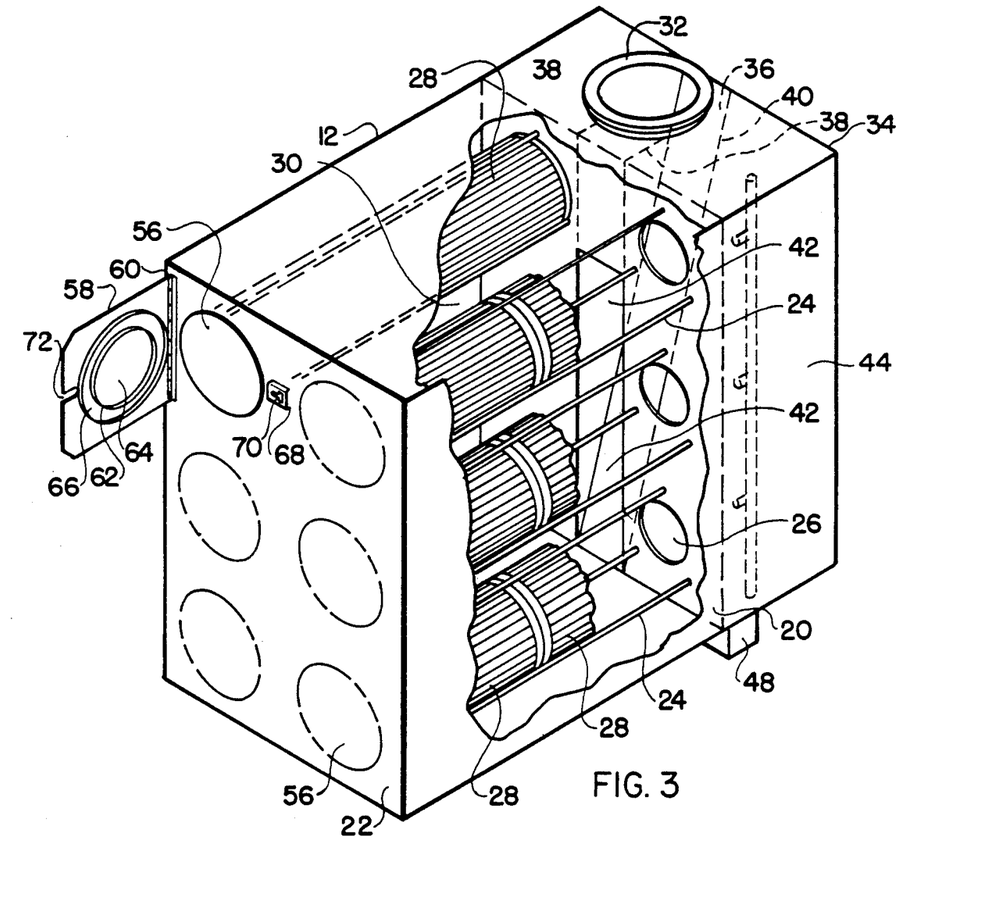
FIG. 3 is a diagrammatic perspective view, partially broken away, illustrating the upper portion of the housing of the filter apparatus illustrated in FIG. 1.

As best seen in FIGS. 2 and 3, the upper housing portion 12 is rectangular in shape, and includes a side wall 20 opposed to and facing an access wall 22. A plurality of support rods 24 extend horizontally across the upper housing portion 12 and they are supported at each end thereof in the access wall 22 and the side wall 20, respectively. As shown in FIG. 3, the side wall 20 has a plurality of outlet openings 26, the function of which will be explained presently, and it will be noted that the support rods 24 are arranged in clusters of three rods lying in a generally circular pattern and spaced from one another so that the bottom two rods in each cluster are parallel to one another whereby a filter element 28 can rest thereon, and the third rod in each cluster is located generally above the filter element 28 so that it is essentially contained against movement in any direction by the cluster of three support rods 24. The filter elements 28 are conventional and may be of any well known constructions, and they are preferably formed as cylinders using a pleated paper filter media. In the disclosed embodiment of the present invention, two cylindrical pleated paper filter elements are supported in each cluster of three support rods, and they are arranged end-to-end with their axes extending horizontally and parallel to the support rods 24 and with the adjacent ends of the two filter elements abutting one another in a sealed relationship as shown in FIG. 3. Preferably, the filter elements 28, and the support rods 24 therefor, are arranged in two vertical columns with a vertical spacing 30 therebetween, and there is a small spacing between each pair of adjacent filter elements in each column to provide a space for air to flow therebetween and around the filter elements 28.

A dirty air inlet conduit 32 is located above a chamber 34 and communicates with an inlet air plenum 36 that is defined by the side wall 20,, two triangular shaped side walls 38, and a flat back wall 40 that extends diagonally across the chamber 34. The inlet plenum 36 communicates with the interior of the upper housing 12 through a rectangular inlet opening 42 formed in the side wall 20. The remainder of the chamber 34 on either side of the enclosed inlet plenum 36 constitutes an outlet plenum 44 in communication with all of the outlet openings 26, it being noted that the portions of the outlet plenum 44 on both sides of the inlet plenum 36 are in open communication with one another in the area behind the diagonally extending end wall 40 of the inlet plenum, whereby all of the outlet air in the outlet plenum 44 can be removed therefrom through the outlet conduit 46. The outlet plenum 44 also houses conventional pulse jet cleaning devices for periodically cleaning the filter elements 28, such pulse jet cleaning device including a compressed air header 48 mounted beneath the outlet plenum 44 which communicates through a pulse valve 50 with each of two vertical pipes 54 arranged in the outlet plenum 44 on each side of the inlet plenum 36 and directly behind the vertical row of outlet openings 26, only one of such vertical pipes 54 being shown in FIG. 3. In a conventional and well known manner, each of the vertically extending pipes 52 are provided with nozzles 54 projecting away from the vertical pipe 52 toward the outlet openings 26. Whenever it is desired to clean the filter elements 28, such as at timed intervals or when a predetermined pressure drop across the filter elements is sensed, the pulse valve 50 for each vertical pipe 52 opens for a short period of time to permit a pulse of high pressure air to flow from the compressed air header 48, through the vertical pipes, and out through the nozzles 54 where the pulses are directed to the interior surfaces of the filter elements 28 to set up a shock wave and reverse air flow that removes foreign matter and dust collected at the exterior surface of the filter elements 28, whereupon such dust and particles eventually fall by gravity to the lower housing or hopper 14 for collection.

The access wall 22 of the upper housing portion 12 is provided with a plurality of access openings 56 through which the filter elements 28 can be inserted into, or removed from, each of the clusters of support rods 24. A closure door 58 is provided at each access opening 56, and is carried by a hinge 60 which permits the closure door to be moved from an open position (see FIG. 3) for insertion and removal of the filter elements, and a closed position (see FIG. 1) for sealing the upper housing portion 12. The inside face of each closure door 58 is provided with an annular ring 62 projecting outwardly therefrom a short distance, and this annular ring 62 is utilized to support resilient material that will engage the end face of the filter elements 28 when the closure doors 58 are moved to their closed position. More specifically, the resilient sealing material is mounted on the inside of the closure door as two separate pieces, namely a first piece 64 which is circular in shape and has a diameter such that it will be held in place within the projecting shoulder 62 by frictional contact therewith, and a second piece 66 which is annular in shape and which fits about the outside surface of the projecting shoulder 62 and held in place by frictional contact thereat. Thus, the two sections of resilient sealing material 64, 66, which are subject to wear because of the abrasive nature of the dust particles and other foreign materials which are handled by the dust collector apparatus, can be quickly and easily replaced without any adhesive or special tools. Also, it is important to note that when the closure door 58 is closed, the annular ring 62 is specially sized to engage the face of the forward filter element 28 and pushes both filter elements 28 along the support rods 24 toward engagement with the side wall 20 to establish a proper sealing relationship between the side wall 20 and rearmost filter element 28, between the two elements 28, and between the forward filter element 28 and the annular ring 62.

Figure 4:
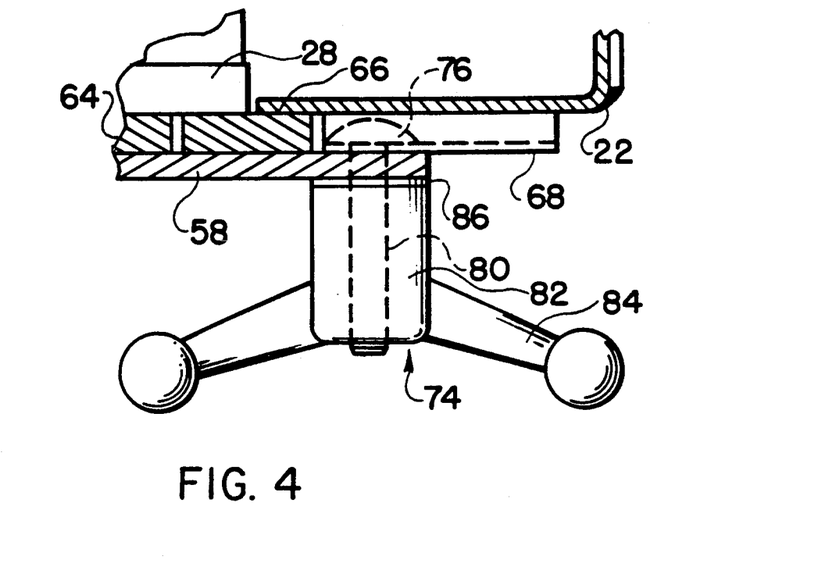
FIG. 4 is a detailed view illustrating the latch arrangement for the access doors.
Figure 5:
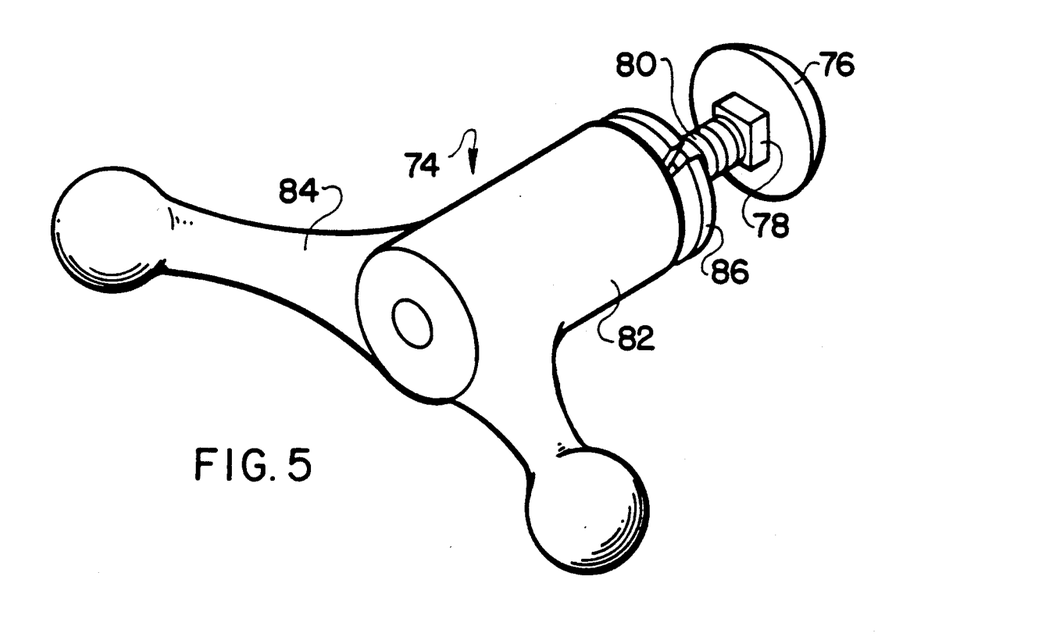
FIG. 5 is a perspective view illustrating the carriage bolt member of the aforesaid latch arrangement.

In accordance with a further feature of the present invention, each closure door 58 is provided with a unique latching arrangement that permits each closure door 58 to be individually secured at its closed position without using any special tools. As best seen in FIGS. 3–5, a slot-forming bracket 68 is fixed to the access wall 22 adjacent each access opening 56, and each bracket 68 includes a T-shaped slot 70. Each closure door 58 is provided with a cooperating slot 72 which, when the closure door is moved to its closed position, will overlap with a portion of the extending end of the T-shaped slot 70. A carriage bolt member 74 is provided, and it includes an enlarged head portion 76 which is larger than the width of the slots 70 and 72 and which is integrally formed with a square projection 78 having a threaded screw 80 extending therefrom to threadably engage a bolt portion 82 that is formed with extending arm portions 84 that can be easily grasped for manual turning. A conventional washer 86 may be provided for abutment with the bolt member 82. In operation, the enlarged head portion 76 is inserted through the top part of the T-shaped slot 70, and the entire latch member is manipulated to locate the enlarged head portion underneath the slot 70 with the square bolt portion 78 slidably disposed in the extending end portion of the T-shaped slot 70. The closure door 58 is then moved to its closed position with the slots 70 and 72 overlapping as described above, and the square nut portion 78 of the latching assembly is then slidably moved in the overlapping slots until the latching member assumes the position shown in FIG. 4. The operator then grasps the threaded bolt portion 82 and tightens it onto the threaded screw 80, whereby the closure door, and the first and second resilient seal elements 64, 66, are urged into positive and sealing relationship with the end of the filter element 28 as shown in FIG. 4. Similarly, when it is necessary to open the closure door 58, the threaded bolt member 82 is manually turned on the threaded screw member 80 until the latch member is in a loosened position, whereupon it can be slidably moved to the right as shown in FIG. 4 and out of contact with the closure door 58. Also, at this position of the latch member, it will be noted that the enlarged head 76 will maintain the latch member within the confines of the slot-forming bracket 68 so that it can be quickly and easily again moved to the left when the closure door 58 is again moved to its closed position for sealing.

Figure 6:
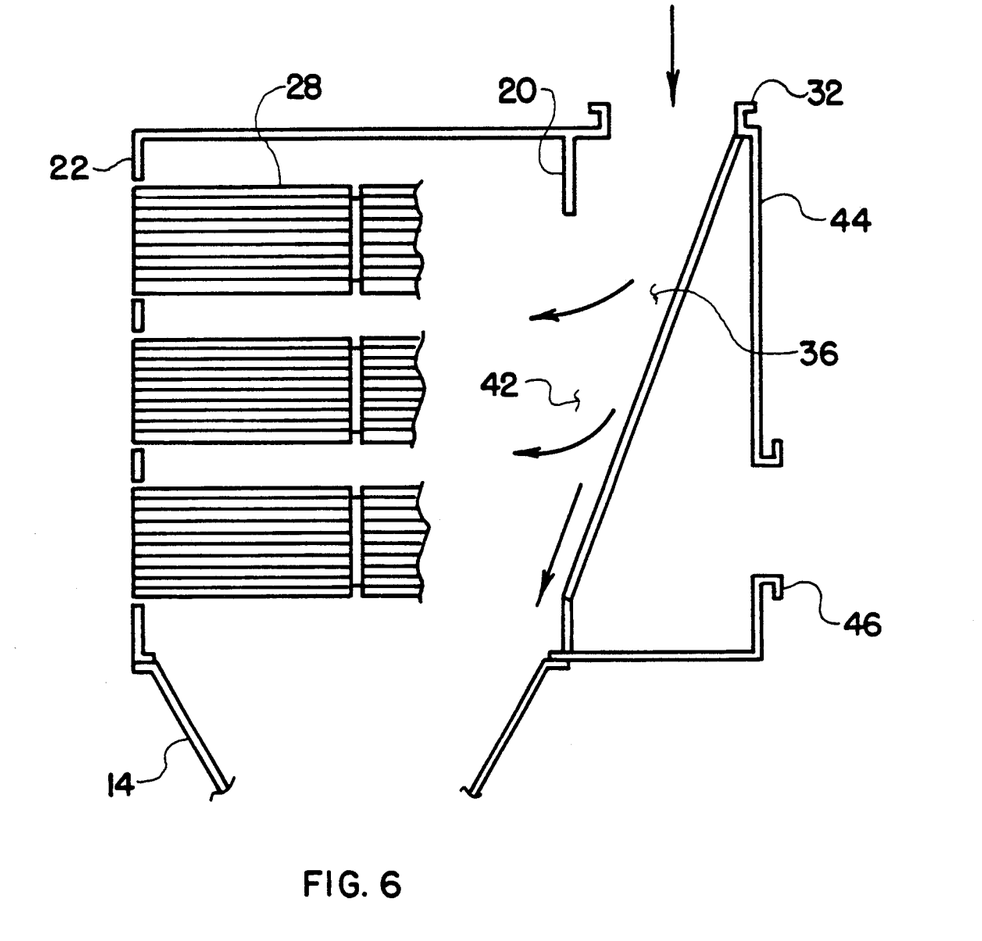
FIG. 6 is a diagrammatic view illustrating the flow path of dust particles within the filter apparatus.

In operation, and with all of the filter elements 28 in place as shown in FIG. 3, a pressure differential is established between the inlet conduit 32 and the outlet conduit 46 so that transport air having dust particles or other foreign matter flows at a relatively high velocity into and through the inlet plenum 36 which is formed, as described above, to direct this transport air in a predetermined flow path directed downwardly toward the hopper or lower housing portion 14 and alongside the exterior surfaces of the filter elements 28. With this downwardly directed flow path, heavier particles of foreign matter which are entrained in the transport air will be carried directly to the hopper 14 by inertia for collection thereat, and the lighter and smaller particles of foreign matter will be carried upwardly in the upper housing 12 by the normal flow of the transport air to and through the filter elements 28 (see FIG. 6). These lighter particles will be deposited or collected at the exterior surface of the filter element as the transport air passes through the filter media of the filter elements 28. The cleaned air flows from the interior portion of the filter elements 28, through the outlet openings 26, through the outlet plenum 44, and is finally discharged through the outlet conduit 46. At periodic timed intervals, or when the collected dust particles accumulate on the exterior surface of the filter elements 28 to such an extent that the pressure drop across the filter elements 28 reaches a predetermined maximum value, the pulse valves 50 are operated in a conventional fashion to cause brief pulses of high pressure air to be admitted from each of the nozzles 54 in a direction toward the interior of the filter elements 28. These high energy pulses cause the collected dust particles to move away from the exterior surface of the filter elements 28, and many, if not most, of these dust particles then fall by gravity to the bottom of the housing for collection at the hopper 14. In some cases, the dust particles may be re-entrained in the transport air so as to be drawn back to the surface of the filter element 28 from which they were separated, or they may move downwardly for re-entrainment and collection at the exterior surface of a filter element below the filter element from which they were originally discharged.

Since many of the heavier particles entrained in the transport air are carried directly to the hopper 14 as described above, these particles need not be filtered from the transport air using the available surface area of the filter elements 28, thereby substantially increasing the operating efficiency of the dust collector of the present invention. Additionally, since there is less loading of dust particles on the surface of the filter elements 28, they will have a longer operating life.

When the filter elements 28 must eventually be replaced, the present invention also provides a structure that permits this replacement procedure to take place quickly and easily, and without requiring any special tools of any kind. More specifically, the carriage bolt member 74 can be easily turned manually by grasping the arms 84 of the threaded bolt member 82 to loosen the carriage bolt member 74, after which it can be easily moved in the slots 70, 72 until the closure door slot 72 is cleared, whereupon the closure door 58 can be opened and the carriage bolt member 74 retained in place within the confines of the bracket 68. The dirty filter elements 28 are then withdrawn through the access openings 56, and it will be noted that no tools or equipment of any kind are required to remove the filter elements 28 since they can simply be slidably moved along the two lowermost support rods 24 of the cluster supporting a particular filter element 28. Similarly, new filter elements can be inserted through the access openings 56 by sliding them along the two lowermost support rods 24 until they are nested as shown in FIG. 3, and it will be noted that the sole support for the filter elements 28 is the two lowermost support rods 24 and the filter elements 28 are otherwise cradled in each cluster of three support rods 24. The closure doors 58 are then pressed into sealing engagement with the outermost ends of the filter elements 28, and the carriage bolt member 74 is again moved inwardly to the position shown in FIG. 4, after which the threaded bolt member 82 can be easily turned manually to secure each closure door in sealing relationship with the adjacent filter elements 28. Thus, the entire operation of replacing exhausted filters with new filters can be done in a matter of minutes, and no tool of any kind is required for any step in the operation. This is a significant improvement in terms of time and effort as compared with known dust collector and filter apparatus as described above.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

I claim:

1. Apparatus for filtering dust and the like entrained in a flow of transport air or other gas, said apparatus comprising:
    (a) generally enclosed housing means having a side wall, an upper filtering portion and a lower collection portion;
    (b) a plurality of filter elements disposed in said upper portion of said housing, each said filter element being generally hollow and mounted with its central axes extending substantially horizontally away from said side wall, and said filter elements being arranged in two generally vertical columns lying in spaced relation to one another and with a predetermined spacing between each filter element;
    (c) inlet means located at said side wall for introducing said transport air and entrained foreign matter into said housing, said inlet means including an inlet opening in said side wall of said housing located between said columns of filter elements, and said inlet means being formed to direct said transport air in a predetermined flow path directed downwardly toward said lower housing portion and generally alongside the exterior surfaces of said filter elements in said vertical columns, whereby heavier particles of foreign matter entrained in said transport air will be carried directly to the lower portion of said housing for collection thereat and lighter particles of foreign matter will be separated from said transport air by said filter elements; and
    (d) outlet means communicating with the interiors of said filter elements for permitting removal of said cleaned transport air when said transport air flows from said inlet means and through said filter elements.

2. Apparatus for filtering dust as defined in claim 1 and further characterized in that said inlet means includes an inlet plenum means formed to receive said transport air adjacent the top of said housing and to direct said transport air in a downward direction toward and through said inlet opening, said inlet plenum means having a generally decreasing cross-sectional area along its downward extent.

3. Apparatus for filtering dust and the like entrained in a flow of transport air or other gas, said apparatus comprising:
    (a) generally enclosed housing means having a side wall, an upper filtering portion and a lower collection portion;
    (b) a plurality of filter elements disposed in said upper portion of said housing, each said filter element being generally hollow and mounted with its central axes extending substantially horizontally away from said side wall, and said filter elements being arranged in at least one generally vertical column with a predetermined spacing between each filter element;
    (c) a plurality of support rods extending generally horizontally across said housing with each said filter element resting on at least two of said support rods which contribute the sole support therefor;

(d) inlet means located at said side wall for introducing said transport air and entrained foreign matter into said housing, said inlet means being formed to direct said transport air in a predetermined flow path directed downwardly toward said lower housing portion and generally alongside the exterior surfaces of said filter elements in said vertical column, whereby heavier particles of foreign matter entrained in said transport air will be carried directly to the lower portion of said housing for collection thereat and lighter particles of foreign matter will e separated from said transport air by said filter elements; and (e) outlet means communicating with the interiors of said filter elements for permitting removal of said cleaned transport air when said transport air flows from said inlet means and through said filter elements.

4. Apparatus for filtering dust as defined in claim 3 and further characterized in that three of said support rods are provided for each of said filter elements and are arranged in a predetermined pattern so that the filter element rests on two of said support rods and the third support rod is located above the surface of said filter element.

5. Apparatus for filtering dust as defined in claim 3 and further characterized in that said housing includes an access wall located opposite said side wall, in that said support rods extend between said side wall and said access wall, and in that said access wall includes a plurality of access openings through which said filter elements can be placed within said housing.

6. Apparatus for filtering dust as defined in claim 5 and further characterized in that closure means are provided at said access wall for selectively covering and uncovering said access openings.

7. Apparatus for filtering dust as defined in claim 6 and further characterized in that said closure means includes a separate door positioned adjacent each said access opening and movable between open and closed positions, each said door having sealing material mounted thereon to sealingly engage the end of a filter element when the door is at its closed position.

8. Apparatus for filtering dust as defined in claim 7 and further characterized in that said closure means includes latch means for selectively maintaining said doors at their closed position, said latch means including a first slot formed in said door, a second cooperating slot formed in said access wall, and a manually operable screw means slidable in said first and second slots between operable and inoperable positions and turnable in said operable position to urge said door and said sealing material thereon into contact with said filter element when said door is at said closed position.

9. Apparatus for filtering dust and the like entrained in a flow of transport air or other gas, said apparatus comprising:

(a) generally enclosed housing means having an upper filtering portion, and a lower collection portion;

(b) a plurality of filter elements disposed in said upper portion of said housing;

(c) inlet means for introducing said transport air and entrained foreign matter into said housing at the upstream side of said filter elements;

(d) outlet means in communication with the downstream side of said filter elements for permitting removal of said transport air after it has passed through said filter elements;

(e) a plurality of support means for individually supporting said filter elements within said upper housing portion;

(f) access openings in said housing disposed adjacent each said support means; and (g) closure door means provided at said access openings for selectively uncovering said access openings to permit a filter element to be placed in or removed from said housing and covering said access openings to enclose said housing during operation of said apparatus, said closure door means including latch means slidable between an operable position for maintaining said closure door means at said position covering said access openings and an inoperable position permitting said closure door means to move to said uncovering position thereof, said latch means also including manually turnable means for selectively securing said closure door to said housing at said operable position of said latch means.

10. Apparatus for filtering dust as defined in claim 9 and further characterized in that said latch means includes a first slot located in said closure door means and a second slot located in said housing at a position to overlap partially said first slot when said closure door is at said covering position thereof, and in that said manually turnable means includes a carriage bolt member having an enlarged head portion which is larger than said first and second slots, a square portion slidable in said first and second slots without turning, a threaded screw portion extending from said square portion, and a threaded bolt portion engaging said threaded screw portion and turnable thereon to selectively secure said closure door to said housing.

11. Apparatus for filtering dust as defined in claim 9 and further characterized in that said closure door means includes resilient sealing material carried thereon at a position to sealingly engage an end of said filter elements when said closure door means is at said covering position thereof.

12. Apparatus for filtering dust as defined in claim 11 and further characterized in that said closure door means includes a separate hinged door located adjacent each said access opening, in that the inside surface of each said hinged door includes an annular shoulder extending outwardly therefrom, and in that said resilient sealing material is provided in two pieces, one piece being circular and frictionally held within said annular shoulder and the other piece being annular and frictionally held at the outside surface of said annular shoulder.

13. Apparatus for filtering dust as defined in claim 11 and further characterized in that said hinged door includes an annular shoulder extending outwardly therefrom and having a predetermined outward extent that is selected to engage an end of one of said filter elements and cause proper sealing engagement at the ends of said filter elements.

14. Apparatus for filtering dust and the like entrained in a flow of transport air or other gas, said apparatus comprising:

(a) a generally enclosed housing having an upper filtering portion and a lower hopper for collecting filtered dust, said upper housing portion having first and second flat side walls disposed in opposing relation to one another;

(b) a plurality of support rods extending horizontally between said first and second side walls within said upper housing portion, said support rods being arranged in groups of three support rods spaced equidistant from one another in a circular pattern, and said groups of support rods being arranged in a pair of vertical columns having a predetermined spacing therebetween with each said column including at least three said groups of support rods;

(c) a hollow horizontally extending cylindrically shaped filter element resting on at least two of said support rods in each said groups, with said two support rods constituting the sole support for said filter element;

(d) inlet means including an opening in said first side wall at a location adjacent said spacing between said vertical columns, and including an inlet plenum formed to direct said transport air in a predetermined flow path directed downwardly toward said lower hopper and alongside the exterior surfaces of said filter elements carried in said vertical columns, whereby heavier particles of said foreign matter entrained in said transport air will be carried directly to said lower hopper for collection thereat and lighter particles of said foreign matter will be separated from said transport air by said filter elements;

(e) outlet means including outlet openings in said first side wall communicating with the interior of each of said filter elements, and including an outlet plenum for receiving said transport air after it has passed through said filter elements and said outlet openings;

(f) an access opening formed in said second side wall adjacent each said group of support rods for permitting filter elements to be inserted in or removed from said upper housing by sliding said filter elements through said access openings and along said support rods;

(g) a hinged closure door located adjacent each said access opening and movable between a first position covering said access opening to enclose said housing and a second position uncovering said access opening to permit insertion or removal of said filter elements, said closure door including latch means for selectively securing said closure door at its first position; and (h) pulse jet means for selectively cleaning said filter elements by transmitting a pulse of high pressure air to the inside of said cylindrical filter elements.

* * * * *

UNITED STATES PATENT AND TRADEMARK OFFICE
CERTIFICATE OF CORRECTION

PATENT NO. : 5,062,872

DATED : November 5, 1991

INVENTOR(S) : Roger D. Williams

It is certified that error appears in the above-identified patent and that said Letters Patent is hereby corrected as shown below:

Column 4, line 45, reads ",," but should read -- , --.

Column 8, line 49, reads "generally" but should read -- gradually --.

Column 9, line 12, reads "e" but should read -- be --.

Signed and Sealed this

Ninth Day of March, 1993

Attest:

STEPHEN G. KUNIN

Attesting Officer

Acting Commissioner of Patents and Trademarks